US012636766B2

(12) United States Patent
Zhang et al.

(10) Patent No.: US 12,636,766 B2
(45) Date of Patent: May 26, 2026

(54) SYSTEM AND METHOD FOR MAINTAINING NAIL GUN

(71) Applicant: JIANGSU DONGCHENG TOOLS TECHNOLOGY CO., LTD, Nantong (CN)

(72) Inventors: Jin Zhang, Nantong (CN); Minming Liu, Nantong (CN)

(73) Assignee: JIANGSU DONGCHENG TOOLS TECHNOLOGY CO., LTD, Nantong (CN)

( * ) Notice: Subject to any disclaimer, the term of this patent is extended or adjusted under 35 U.S.C. 154(b) by 13 days.

(21) Appl. No.: 18/725,148

(22) PCT Filed: Jun. 29, 2023

(86) PCT No.: PCT/CN2023/103597

§ 371 (c)(1),
(2) Date: Jun. 28, 2024

(87) PCT Pub. No.: WO2024/093302

PCT Pub. Date: May 10, 2024

(65) Prior Publication Data

US 2025/0153328 A1 May 15, 2025

(30) Foreign Application Priority Data

Oct. 31, 2022 (CN) ........................ 202211343526.0

(51) Int. Cl.
*B25C 1/06* (2006.01)

(52) U.S. Cl.
CPC .................................... *B25C 1/06* (2013.01)

(58) Field of Classification Search
CPC ........... B25C 1/06; B25C 1/008; B25C 1/005; B25C 1/04; B25C 1/047; B25C 1/08; B25C 1/10
See application file for complete search history.

(56) References Cited

U.S. PATENT DOCUMENTS

| | | | | |
|---|---|---|---|---|
| 2009/0023638 | A1 | 1/2009 | Asotra et al. | |
| 2009/0236387 | A1 * | 9/2009 | Simonelli .............. | B25F 5/006 227/8 |

FOREIGN PATENT DOCUMENTS

| | | |
|---|---|---|
| CN | 101890472 | 11/2010 |
| CN | 101939143 | 1/2015 |
| CN | 105856173 | 8/2016 |
| CN | 108544428 | 9/2018 |
| CN | 216883803 | 7/2022 |
| CN | 115781597 | 3/2023 |
| JP | 2008-229778 | 10/2008 |
| WO | 2019026592 | 2/2019 |

* cited by examiner

*Primary Examiner* — Veronica Martin
(74) *Attorney, Agent, or Firm* — ScienBiziP, P.C.

(57) ABSTRACT

A system and a method for maintaining a nail gun is provided. A maintenance module is added on a circuit board; when a controller detects that the maintenance module is in a low-level state, it is determined that a nail gun is in a maintenance mode; at this time, a trigger module is triggered, and a motor rotates reversely to control an ejection module to be in a relaxed state; and in this state, the nail gun can be directly disassembled and maintained, without the need to look for an external tool for operation.

19 Claims, 6 Drawing Sheets

SYSTEM AND METHOD FOR MAINTAINING NAIL GUN

The present application claims a priority of a Chinese patent application with an application number 202211343526.0 filed with the China National Intellectual Attribute Administration on Oct. 31, 2022, entire contents of which are incorporated by reference in the present application.

TECHNICAL FIELD

The present application relates to a field of power tools, and in particular to a system and a method for maintaining a nail gun.

BACKGROUND

Nail guns are widely used in home decoration, sofa, construction, shoemaking, leather making, packaging and other industries, especially in a decoration industry, which has used nail guns for a long time. Due to a widespread use of the nail guns, a variety of new products are constantly coming out, such as pneumatic nail guns, lithium electric nail guns, etc.

At present, when the lithium electric nail gun is driving a nail, an elastic force of an internal spring is needed to release a nail inside the nail gun. A specific principle nailing includes pressing a switch of a trigger to drive a motor to rotate, thereby causing the spring to change from a compressed state to a relaxed state, and release the nail, then the motor rotates again to bring the spring to the compressed state, waiting for a next nailing. During this process, when the nail gun needs a maintenance (repair or maintenance), its spring is still in the compressed state. At the time, if it is disassembled for the maintenance, the spring may pop out and injure people or eject an internal part of the nail gun.

The existing utility patent with a number CN216883803U discloses a nail gun which is easy for maintenance. When the nail gun fails, a motor shaft can be rotated in an opposite direction by an external tool, so that a notched gear drives a nail rod to move in a direction of shooting the nail, thereby an energy storage state of the spring for power supply is released. During disassembling the nail gun, the nail rod in the energy storage state can be prevented from being accidentally fired due to an operational error, thereby a life safety of a maintenance personnel is ensured. However, this method requires a use of the external tool for operation, which is cumbersome and inconvenient, and has extremely low work efficiency.

Therefore, it is necessary to design a system and a method for maintaining the nail gun to solve the above problems.

SUMMARY OF THE APPLICATION

In view of deficiencies of the prior art, an object of the present application is to provide a system and a method for maintaining a nail gun, which adopts the following technical solutions:

A maintenance system of a nail gun, comprising a power module, a drive module, a motor and a controller, the power module being connected to the drive module, the drive module being connected to the motor, and the controller being connected to the drive module; wherein the maintenance system further comprises a maintenance module, a trigger module, and an ejection module; the controller is connected to the maintenance module and is used to detect a level state of the maintenance module;

The controller determines a working mode of the nail gun according to the level state;

The ejection module is connected to the motor and driven by the motor;

The trigger module is connected to the controller and transmits a driving signal to the controller according to the working mode to control an operation of the motor, thereby controlling an operating state of the ejection module.

Furthermore, the level state comprises a high level state and a low level state, and the working mode comprises a nailing mode and a maintenance mode; when the controller detects that the maintenance module is in the high level state, the nail gun is in the nailing mode; when the controller detects that the maintenance module is in the low level state, the nail gun is in the maintenance mode.

Furthermore, the operating state of the ejection module comprises a compressed state and a relaxed state; when the nail gun is in the nailing mode, the ejection module is in the compressed state, the trigger module is triggered to control the motor to rotate forward and drive the ejection module to complete a nailing; when the nail gun is in the maintenance mode, the trigger module is triggered to control the motor to rotate reversely to control the ejection module to be in the relaxed state.

Furthermore, the maintenance module comprises a key switch and a capacitor, an a end of the key switch is connected to the controller, an b end is grounded, the capacitor is connected in parallel between the a end and the b end of the key switch, and the a end of the key switch is electrically connected to a pull-up power supply;

When the key switch is turned on, the controller detects that a level signal of the a end of the key switch is 1, and the nail gun is in the nailing mode;

When the key switch is closed, the controller detects that the level signal at the a end of the key switch is 0, and the nail gun is in the maintenance mode.

The present application provides a method for maintaining a nail gun applied to the maintenance system, comprising following steps:

S1: presetting a threshold value Q of a maintenance parameter of the nail gun;

S2: obtaining a maintenance parameter q of the nail gun;

Determining whether the maintenance parameter q of the nail gun is greater than or equal to the threshold value Q;

S3: when the maintenance parameter q of the nail gun is greater than or equal to the threshold value Q of the maintenance parameter of the nail gun, and the key switch is pressed, and making the nail gun entering a maintenance mode for maintenance.

Furthermore, when the maintenance parameter q of the nail gun is less than the threshold value Q of the maintenance parameter of the nail gun, the nail gun enters a nailing mode.

Furthermore, the threshold value Q of the maintenance parameter of the nail gun comprises at least one of a threshold value T of a maintenance time of the nail gun, a threshold value N of a number of turns the motor has rotated, and a threshold value M of a number of nails driven by the nail gun.

Furthermore, when the threshold value Q of the maintenance parameter of the nail gun is the threshold value T of the maintenance time of the nail gun, the maintenance parameter q of the nail gun is a running time t of the motor;

And/or

When the threshold value Q of the maintenance parameter of the nail gun is the threshold value N of the number of turns the motor has rotated, the maintenance parameter q of the nail gun is a number n of turns the motor has rotated;

And/or

When the threshold value Q of the maintenance parameter of the nail gun is the threshold value M of the number of nails driven by the nail gun, the maintenance parameter q of the nail gun is a number m of nails driven by the nail gun.

The present application provides a method for maintaining a nail gun applied to the maintenance system, comprising following steps:

S1: obtaining a working state of the nail gun;

S2: determining whether the nail gun enters a maintenance mode according to the working state;

S3: when a fault state occurs in the working state, and the key switch is pressed, making the nail gun enter the maintenance mode;

S4: triggering the trigger module to transmit a driving signal of the motor to the controller, thereby controlling the ejection module to be in the relaxed state;

S5: disassembling the nail gun for maintenance.

Furthermore, in the step S3, when there is no fault state in the working state, the nail gun enters a nailing mode, and the fault state comprises at least one of a short circuit state, an open circuit state and a stuck nail state.

Compared with the prior art, the present application has the following beneficial effects:

(I) The present application adds the maintenance module to a circuit board. When the controller detects that the maintenance module is in the low level state, it determines that the nail gun is in the maintenance mode. At the time, by triggering the trigger module, the motor rotates in an opposite direction to control the ejection module to be in the relaxed state. In this state, the nail gun can be directly disassembled for maintenance without finding an external tool for operation. The entire disassembly and maintenance process is simplified and intelligent, which greatly improves the work efficiency. At the same time, it avoids the problem of the spring being in an energy storage state and popping out to injure people or ejecting internal parts of the nail gun.

(II) The present application first determines whether the nail gun needs to be disassembled for maintenance by comparing the maintenance parameter q of the nail gun with the threshold value Q of the maintenance parameter of the nail gun, that is, when q≥Q, pressing the key switch makes the nail gun enter the maintenance mode; then triggering the trigger module to transmit the driving signal of the motor to the controller, thereby controlling the ejection module to be in a relaxed state; finally, the nail gun is disassembled for maintenance; the entire disassembly and maintenance process is simplified and intelligent, which is convenient for users to regularly disassemble the nail gun for maintenance, greatly reducing the failure rate of the nail gun, and also improving the safety factor of the use of the nail gun.

(III) The present application first determines whether the nail gun needs to be disassembled for maintenance by detecting the working state of the nail gun, that is, when the working state of the nail gun fails, the key switch is pressed to make the nail gun enter the maintenance mode; then the trigger module is triggered to transmit the driving signal of the motor to the controller, thereby controlling the ejection module to be in a relaxed state; finally, the nail gun is directly disassembled for maintenance; the entire disassembly and maintenance process is simplified and intelligent, which greatly reduces the failure rate of the nail gun and also improves the safety factor of the use of the nail gun.

BRIEF DESCRIPTION OF THE DRAWINGS

The specific embodiments of the present application are further described in detail below with reference to the accompanying drawings.

DETAILED DESCRIPTION

The present application is further described in detail below in conjunction with the accompanying drawings and implementations.

Figure 1:
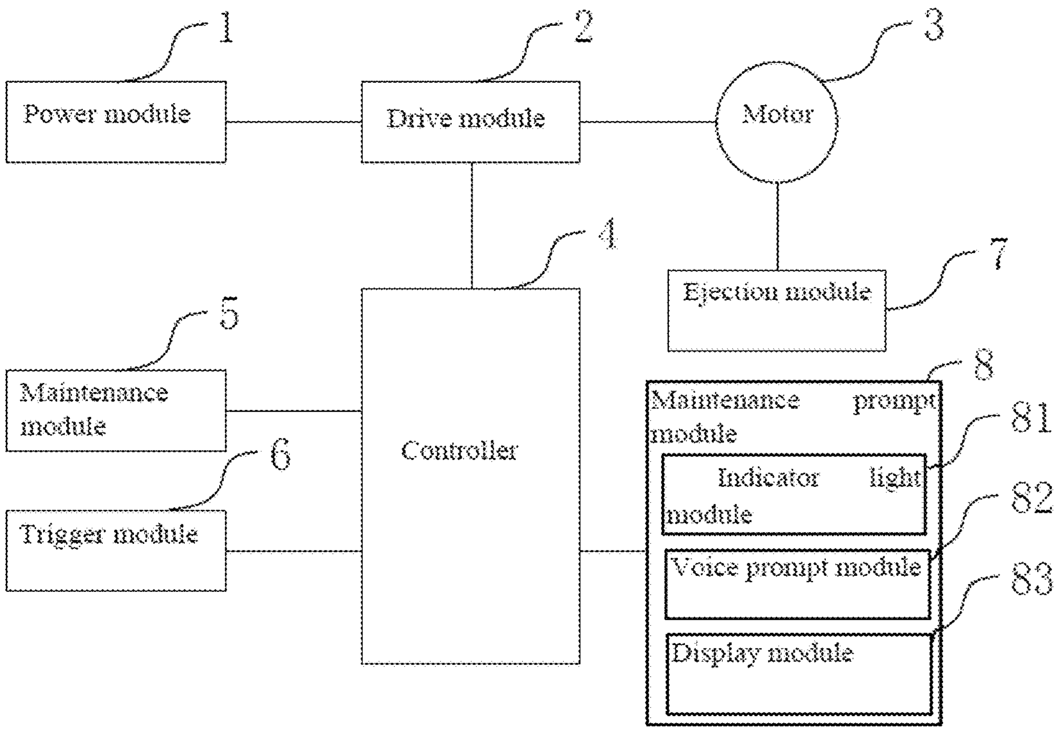
FIG. 1 is a circuit diagram of a maintenance system of a nail gun of the present application.

Embodiment 1: Referring to FIG. 1, a maintenance system of a nail gun includes a power module 1, a drive module 2, a motor 3 and a controller 4. The power module 1 is connected to the drive module 2, the drive module 2 is connected to the motor 3, the controller 4 is connected to the drive module 2, the drive module 2 is a three-phase inverter, and the controller 4 is an MCU controller; the maintenance system further includes a maintenance module 5, a trigger module 6, and an ejection module 7; the controller 4 is connected to the maintenance module 5, and is used to detect a level state of the maintenance module 5; the controller 4 determines a working mode of the nail gun according to the level state.

Among them, the level state includes a high level state and a low level state, and the working mode includes a nailing mode and a maintenance mode. When the controller 4 detects that the maintenance module 5 is in the high level state, the nail gun is in the nailing mode, among them, the nailing mode is a normal working mode and normal nailing operations can be performed; when the controller 4 detects that the maintenance module 5 is in the low level state, the nail gun is in the maintenance mode, that is, the nail gun needs to be disassembled for maintenance at the time.

In this embodiment, the trigger module 6 is connected to the controller 4, and transmits a driving signal to the controller 4 according to the working mode to control an operation of the motor 3, and then controls an operating state of the ejection module 7; the ejection module 7 is connected to the motor 3 and driven by the motor 3; among them, the operating state of the ejection module 7 includes a compressed state and a relaxed state. When the nail gun is in the nailing mode, the ejection module 7 is in the compressed state, the trigger module 6 is triggered at the time to control the motor 3 to rotate forward and drive the ejection module 7 to complete a nailing; when the nail gun is in the maintenance mode, the trigger module 6 is triggered to control the motor 3 to rotate reversely to control the ejection module 7 to be in the relaxed state.

In addition, the ejection module 7 includes a spring. When the ejection module 7 is in the relaxed state, the spring is in the relaxed state; when the ejection module 7 is in the compressed state, the spring is in the compressed state.

Figure 2:
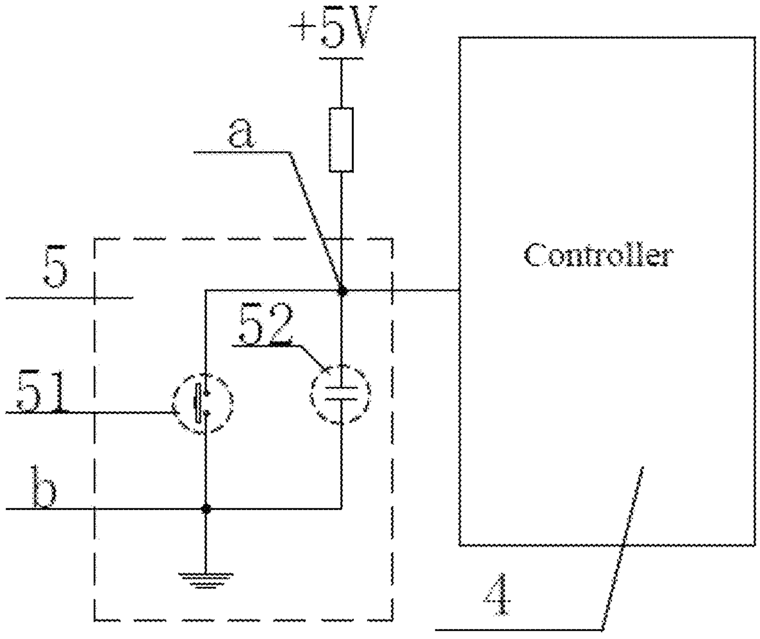
FIG. 2 is a circuit diagram of a maintenance module of the maintenance system of the nail gun of the present application.

Please continue to refer to FIG. 2, the maintenance module 5 includes a key switch 51 and a capacitor 52, an a end of the key switch 51 is connected to the controller 4, an b end is grounded, and the capacitor 52 is connected in parallel between the a end and the b end of the key switch 51 to eliminate a mechanical jitter when the key switch 51 is pressed; among them, the a end of the key switch 51 is electrically connected to a pull-up power supply, when the key switch 51 is turned on, and the controller 4 detects that a level signal of the a end of the key switch 51 is 1, and the nail gun enters the nailing mode, that is, the nail gun is in the normal working mode at the time, and can perform the normal nailing operation;

When the key switch 51 is closed, and the controller 4 detects that the level signal at the a end of the key switch 51 is 0, and the nail gun enters the maintenance mode, that is, the nail gun needs to be disassembled for maintenance. A user can judge when it is appropriate to disassemble the nail gun for maintenance based on his or her own usage experience, and then activate the key switch 51 to activate the nail gun into the maintenance mode. In addition, the usage experience may include a time length of the nail gun has been used, a number of nails driven by the nail gun, a degree of a physical wear of the nail gun, and whether the nail gun is faulty, etc.

The embodiment adds the maintenance module 5 to a circuit board, when the controller 4 detects that the maintenance module 5 is in the low level state, it determines that the nail gun is in the maintenance mode. At the time, by triggering the trigger module 6, the motor 3 rotates in the opposite direction to control the ejection module 7 to be in the relaxed state, and in this state, the nail gun can be directly disassembled for maintenance without finding the external tool for operation. An entire disassembly maintenance process is simplified and intelligent, which greatly improves a work efficiency. At the same time, it avoids the problem of the spring being in the energy storage state and popping out to injure people or ejecting the internal part of the nail gun.

Figure 3:
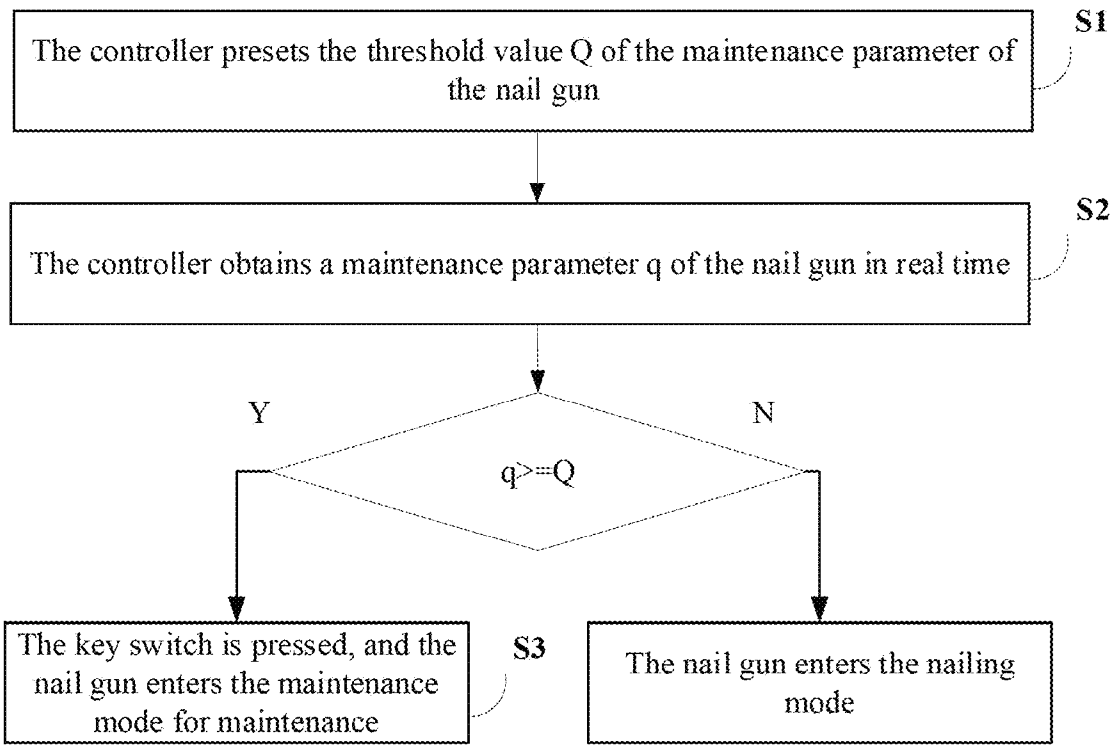
FIG. 3 is a principle flow chart of an embodiment 2 of a method for maintaining the nail gun of the present application.

Embodiment 2: Referring to FIG. 3, the present application provides a method for maintaining the nail gun, which is applied to the above-mentioned maintenance system of the nail gun and includes the following steps:

- S1: The controller 4 presets a threshold value Q of a maintenance parameter of the nail gun;
- S2: The controller 4 obtains a maintenance parameter q of the nail gun in real time;
- S3: When the maintenance parameter q of the nail gun is greater than or equal to the threshold value Q of the maintenance parameter of the nail gun, and the key switch 51 is pressed, the nail gun enters the maintenance mode for maintenance.

Among them, in step S3, when the maintenance parameter q of the nail gun is less than the threshold value Q of the maintenance parameter of the nail gun, the nail gun enters the nailing mode.

In this embodiment, the maintenance parameter q of the nail gun is compared with the threshold value Q of the maintenance parameter of the nail gun to determine whether the nail gun needs to be disassembled for maintenance. That is, when q≥Q, the key switch 51 is pressed to make the nail gun enter the maintenance mode; then the trigger module 6 is triggered to transmit the driving signal of the motor 3 to the controller 4, thereby controlling the ejection module 7 to be in the relaxed state; finally, the nail gun is disassembled for maintenance; the entire disassembly maintenance process is simplified and intelligent, which is convenient for the user to regularly disassemble the nail gun for maintenance, greatly reducing a failure rate of the nail gun, and also improving the safety factor of the use of the nail gun.

In addition, in the embodiment, the threshold value Q of the maintenance parameter of the nail gun includes at least one of a threshold value T of a maintenance time of the nail gun, a threshold value N of a number of turns the motor has rotated, and a threshold value M of a number of nails driven by the nail gun.

When the threshold value Q of the maintenance parameter of the nail gun is the threshold value T of the maintenance time of the nail gun, the maintenance parameter q of the nail gun is a running time t of the motor;

And/or

When the threshold value Q of the maintenance parameter of the nail gun is the threshold value N of the number of turns the motor has rotated, the maintenance parameter q of the nail gun is a number n of turns the motor has rotated;

And/or

When the threshold value Q of the maintenance parameter of the nail gun is the threshold value M of the number of nails driven by the nail gun, the maintenance parameter q of the nail gun is a number m of nails driven by the nail gun.

In summary, by selecting any one of the above three threshold values Q of the maintenance parameters of the nail gun, the nail gun can be regularly maintained with a high flexibility. The following describes in detail the usage of the above three threshold values Q of the maintenance parameters of the nail gun in conjunction with specific embodiments.

Figure 4:
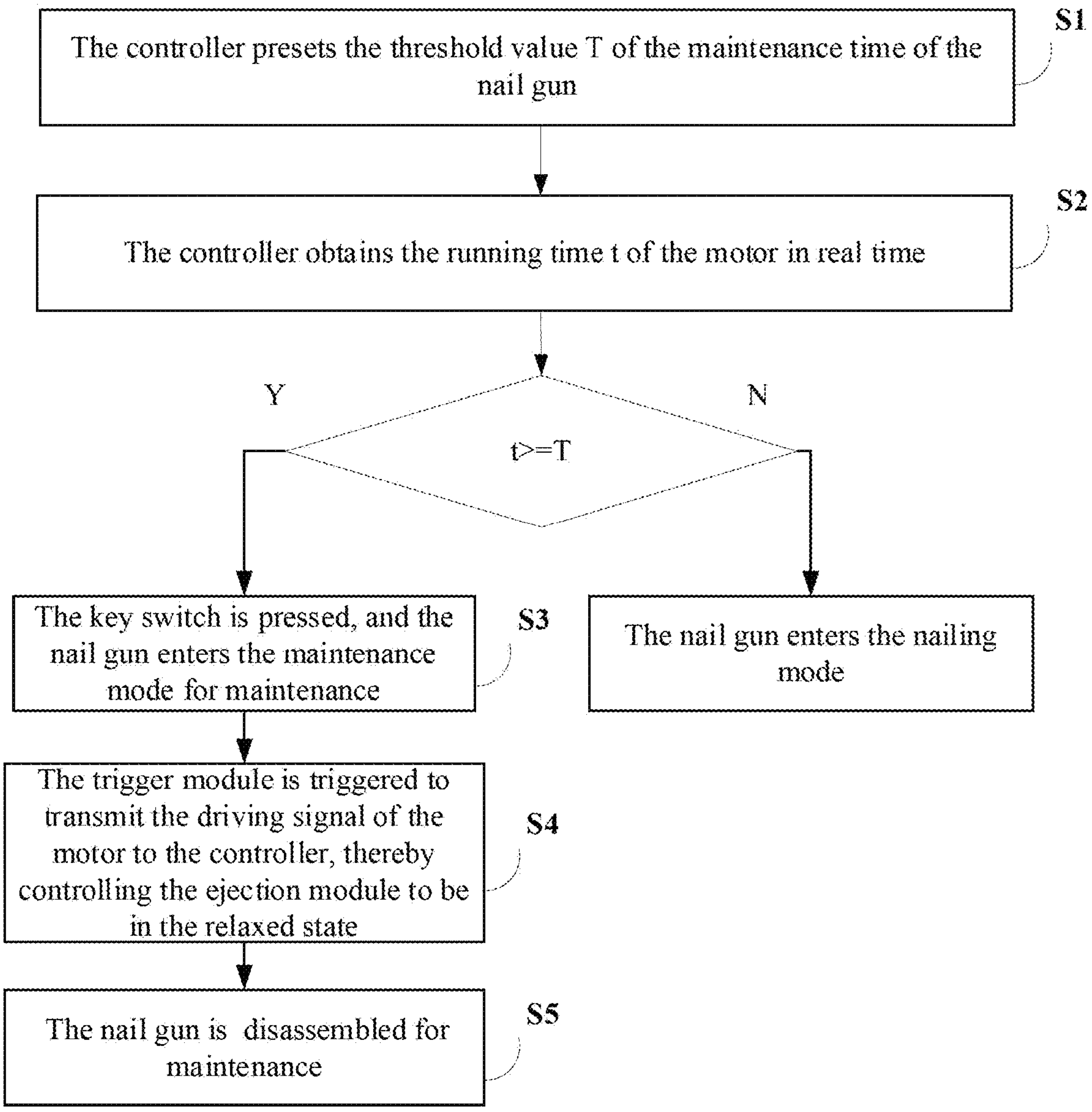
FIG. 4 is a principle flow chart of an embodiment 3 of a method of maintaining the nail gun of the present application.

Embodiment 3: Referring to FIG. 4, the present application provides a method of maintaining the nail gun, which is applied to the above-mentioned maintenance system of the nail gun and includes the following steps:

- S1: The controller 4 presets the threshold value T of the maintenance time of the nail gun;
- S2: The controller 4 obtains the running time t of the motor 3 in real time, and the running time t is an accumulated running time length of the motor 3;
- S3: When t≥T, the user presses the key switch 51, so that the nail gun enters the maintenance mode;
- S4: The user triggers the trigger module 6 to transmit the driving signal of the motor 3 to the controller 4, thereby controlling the ejection module 7 to be in the relaxed state;
- S5: The user disassembles the nail gun for maintenance.

Among them, in step S3, when the running time t of the motor 3 is less than the threshold value T of the maintenance time of the nail gun, the nail gun enters the nailing mode, which is the normal working mode, that is, the user can perform normal nailing operations.

In this embodiment, the controller 4 may also be connected to a maintenance prompt module 8. When the running time t of the motor 3≥the threshold value T of the maintenance time of the nail gun, the controller 4 controls the maintenance prompt module 8 to issue an alarm or a voice prompt, among them, the maintenance prompt module 8 includes at least one of an indicator light module 81 and a voice prompt module 82; the indicator light module 81 includes an LED light, which prompts the user through a color or a flashing of the LED light that the nail gun needs to be disassembled for maintenance at the time; the voice prompt module 82 includes a voice player, which plays a voice through the voice player to prompt the user that the nail gun needs to be disassembled for maintenance at the time.

The threshold value T of the maintenance time of the nail gun involved in the above embodiment has a value range of 360 h~480 h.

A working principle of this embodiment is:

Assuming that the threshold value T of the maintenance time of the nail gun is 400 h, when the running time t of the motor 3 obtained in real time by the controller 4 is greater than or equal to 400 h, the controller 4 controls the maintenance prompt module 8 to issue the alarm or the voice prompt to notify the user that the nail gun needs to be disassembled for maintenance at the time, and then the user triggers the trigger module 6 to transmit the driving signal of the motor 3 to the controller 4, thereby controlling the ejection module 7 to be in the relaxed state and disassembling the nail gun for maintenance; after the disassembly maintenance, the running time t of the motor 3 is reset to zero and counted again.

Among them, as the accumulated use time of the nail gun increases, a time interval for maintenance or servicing is also decreased, and a value setting for a corresponding threshold value T of the maintenance time of the nail gun is also decreased, which further ensures the use safety of the nail gun and extends a service life of the nail gun.

The embodiment first determines whether the nail gun needs to be disassembled for maintenance by comparing the running time t of the motor 3 with the threshold value T of the maintenance time of the nail gun, that is, when t≥T, the key switch 51 is pressed to make the nail gun enter the maintenance mode; then the trigger module 6 is triggered to transmit the driving signal of the motor 3 to the controller 4, thereby controlling the ejection module 7 to be in the relaxed state; finally, the nail gun is disassembled for maintenance; the entire disassembly and maintenance process is simplified and intelligent, which is convenient for the user to disassemble the nail gun regularly for maintenance, greatly reducing the failure rate of the nail gun, and also improving a safety factor of a use of the nail gun.

Figure 5:
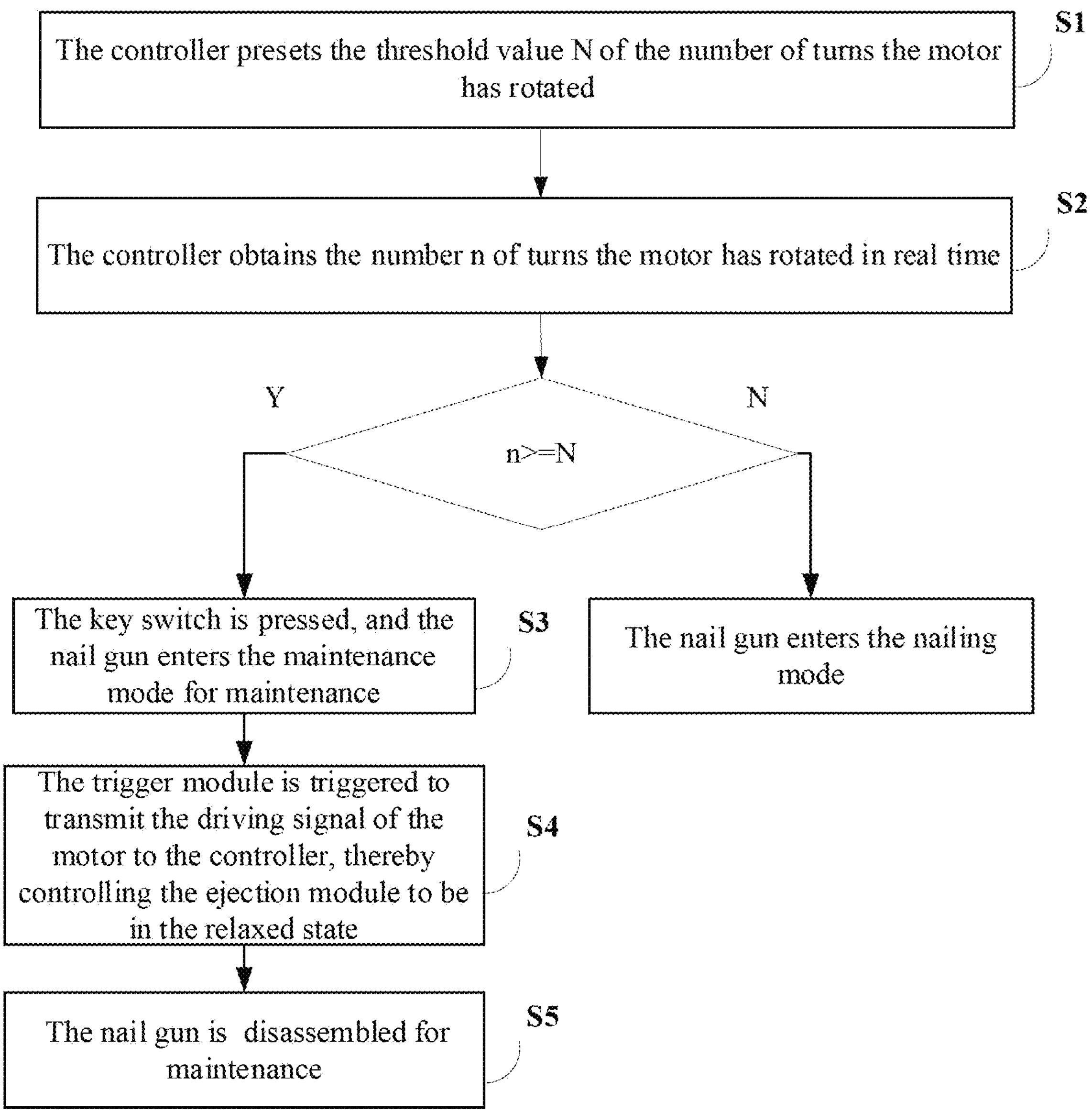
FIG. 5 is a principle flow chart of an embodiment 4 of a method of maintaining the nail gun of the present application.

Embodiment 4: Referring to FIG. 5, the present application provides another method of maintaining the nail gun, which is applied to the above-mentioned maintenance system of the nail gun and includes the following steps:

- S1: The controller 4 presets the threshold value N of the number of turns the motor 3 has rotated;
- S2: The controller 4 obtains the number n of turns the motor 3 has rotated in real time, where the number n of turns is an accumulated number of turns the motor 3 has rotated;
- S3: When n≥N, the user presses the key switch 51 to make the nail gun enter the maintenance mode;
- S4: The user triggers the trigger module 6 to transmit the driving signal of the motor 3 to the controller 4, thereby controlling the ejection module 7 to be in the relaxed state;
- S5: The user disassembles the nail gun for maintenance.

Among them, in step S3, when the number n of turns the motor 3 has rotated is less than the threshold value N of the number of turns the motor 3 has rotated, the nail gun enters the nailing mode, which is the normal working mode, that is, the user can perform normal nailing operations.

In this embodiment, the controller 4 may also be connected to the maintenance prompt module 8. When the number n of turns the motor 3 has rotated is greater than or equal to the threshold value N of the number of turns the motor 3 has rotated, the controller 4 controls the maintenance prompt module 8 to issue the alarm or the voice prompt, among them, the maintenance prompt module 8 includes at least one of the indicator light module 81 and the voice prompt module 82; the indicator light module 81 includes the LED light, which prompts the user through the color or the flashing of the LED light that the nail gun needs to be disassembled for maintenance at the time; the voice prompt module 82 includes the voice player, which plays the voice through the voice player to prompt the user that the nail gun needs to be disassembled for maintenance at the time.

The above embodiments of the number of turns the motor 3 has rotated involved in the above embodiment has a value range of 300,000 to 500,000.

The working principle of this embodiment is:

Assume that the threshold value N of the number of turns the motor 3 has rotated is 400,000. When the controller 4 obtains in real time that the number n of turns the motor 3 has rotated is greater than or equal to 400,000, the controller 4 controls the maintenance prompt module 8 to issue the alarm or the voice prompt to notify the user that the nail gun needs to be disassembled for maintenance. Then the user triggers the trigger module 6 to transmit the driving signal of the motor 3 to the controller 4, thereby controlling the ejection module 7 to be in the relaxed state and disassembling the nail gun for maintenance. After the disassembly maintenance, the number n of turns the motor 3 has rotated is reset to zero and counted again.

Among them, as the accumulated use time of the nail gun increases, the time interval for maintenance or servicing is decreased, and a value setting for the threshold value N of the number of turns the corresponding motor 3 has rotated is decreased, which further ensures the use safety of the nail gun and extends the service life of the nail gun.

Whether the nail gun needs to be disassembled for maintenance by comparing the threshold value N of the number of turns the motor 3 has rotated with the number n of turns the motor 3 has rotated, that is, when n≥N, the key switch 51 is pressed to make the nail gun enter the maintenance mode; then the trigger module 6 is triggered to transmit the driving signal of the motor 3 to the controller 4, thereby the ejection module 7 is controlled to be in the relaxed state; finally, the nail gun is disassembled for maintenance; the entire disassembly and maintenance process is simplified and intelligent, which is convenient for the user to perform the irregular disassembly and maintenance on the nail gun, greatly reducing the failure rate of the nail gun, and also improving the safety factor of the use of the nail gun.

Figure 6:
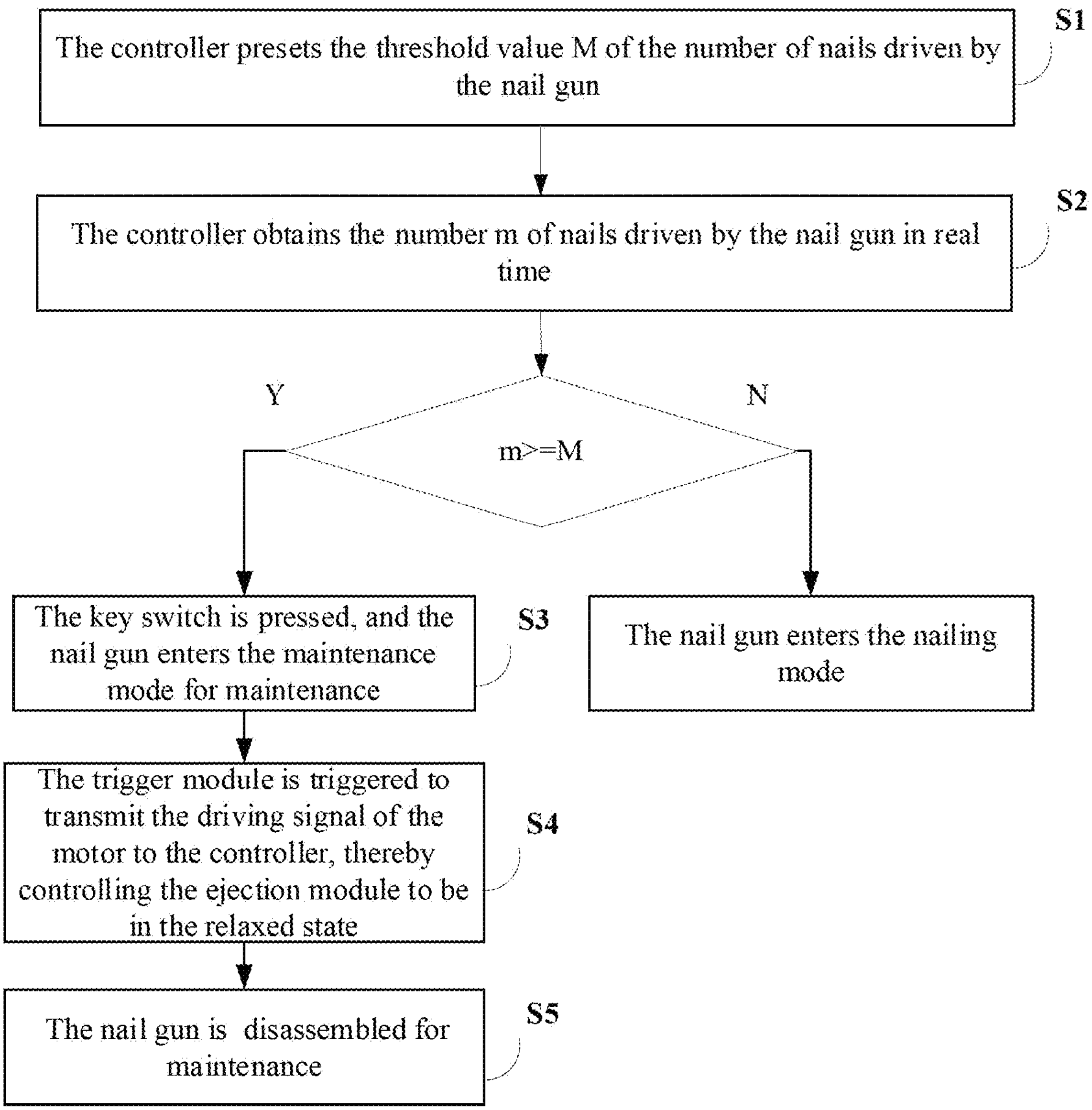
FIG. 6 is a principle flow chart of an embodiment 5 of a method of maintaining the nail gun of the present application.

Embodiment 5: Referring to FIG. 6, the present application provides another method for maintaining the nail gun, which is applied to the above-mentioned maintenance system of the nail gun and includes the following steps:

S1: The controller 4 presets the threshold value M of the number of nails driven by the nail gun;

S2: The controller 4 obtains the number m of nails driven by the nail gun in real time, where the number m of nails is an accumulated number of nails driven by the nail gun;

S3: When m≥M, the user presses the key switch 51 to make the nail gun enter the maintenance mode;

S4: The user triggers the trigger module 6 to transmit the driving signal of the motor 3 to the controller 4, thereby controlling the ejection module 7 to be in the relaxed state;

S5: The user disassembles the nail gun for maintenance.

Among them, in step S3, when the number m of nails driven by the nail gun is less than the threshold value M of the number of nails driven by the nail gun, the nail gun enters the nailing mode, which is the normal working mode, that is, the user can perform normal nailing operations.

In this embodiment, the controller 4 may also be connected to the maintenance prompt module 8. When the number m of nails driven by the nail gun is greater than or equal to the threshold value M of the number of nails driven by the nail gun, the controller 4 controls the maintenance prompt module 8 to issue the alarm or the voice prompt, among them, the maintenance prompt module 8 includes at least one of the indicator light module 81 and the voice prompt module 82; the indicator light module 81 includes the LED light, which prompts the user through the color or the flashing of the LED light that the nail gun needs to be disassembled for maintenance at the time; the voice prompt module 82 includes the voice player, which plays the voice through the voice player to prompt the user that the nail gun needs to be disassembled for maintenance at the time.

The threshold value M of the number of nails driven by the nail gun involved in the above embodiment has a value range of 30,000 to 50,000.

A working principle of this embodiment is:

Assume that the threshold value M of the number of nails driven by the nail gun is 40,000. When the controller 4 obtains in real time that the number m of nails driven by the nail gun is greater than or equal to 40,000, the controller 4 controls the maintenance prompt module 8 to issue the alarm or the voice prompt to notify the user that the nail gun needs to be disassembled for maintenance. Then the user triggers the trigger module 6 to transmit the driving signal of the motor 3 to the controller 4, thereby controlling the ejection module 7 to be in a relaxed state and disassembling the nail gun for maintenance. After the disassembly maintenance, the number m of nails driven by the nail gun is reset to zero and counted again.

Among them, as the accumulated use time of the nail gun increases, the time interval for maintenance or servicing is decreased, and a value setting for the threshold value M of the number of nails driven by the corresponding nail gun is also decreased, which further ensures the use safety of the nail gun and extends the service life of the nail gun.

This embodiment first determines whether the nail gun needs to be disassembled for maintenance by comparing the number m of nails driven by the nail gun with the threshold value M of the number of nails driven by the nail gun, that is, when m≥M, the key switch 51 is pressed to make the nail gun enter the maintenance mode; then the trigger module 6 is triggered to transmit the driving signal of the motor 3 to the controller 4, thereby the ejection module 7 is controlled to be in the relaxed state; finally, the nail gun is disassembled for maintenance; the entire disassembly and maintenance process is simplified and intelligent, which is convenient for the user to perform the irregular disassembly and maintenance on the nail gun, greatly reducing the failure rate of the nail gun, and also improving the safety factor of the use of the nail gun.

Figure 7:
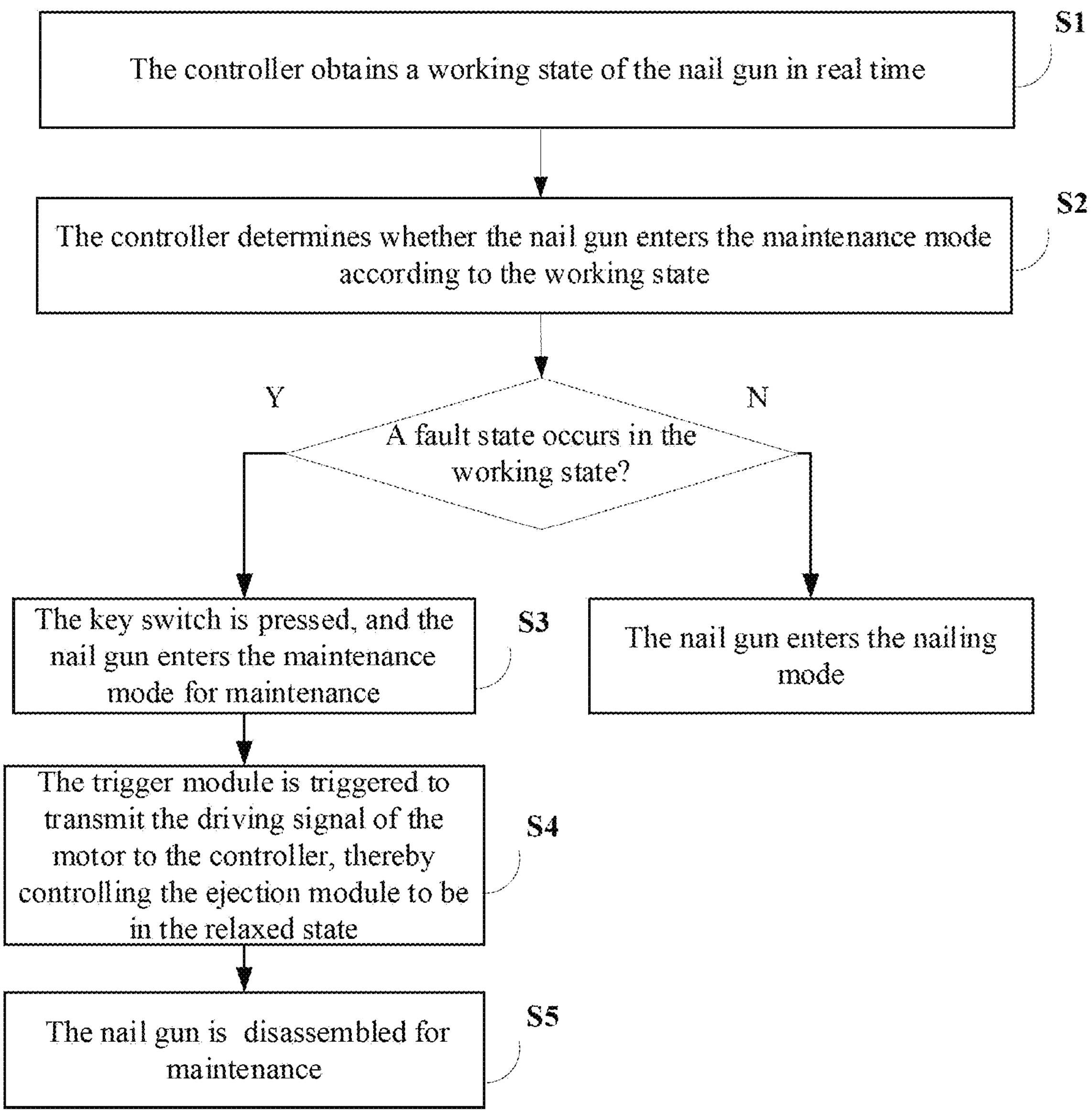
FIG. 7 is a principle flow chart of an embodiment 6 of a method of maintaining the nail gun of the present application.

Embodiment 6: Referring to FIG. 7, the present application provides another method of maintaining the nail gun, which is applied to the above-mentioned maintenance system of the nail gun and includes the following steps:

S1: The controller 4 obtains a working state of the nail gun in real time;

S2: The controller 4 determines whether the nail gun enters the maintenance mode according to the working state;

S3: When a fault state occurs in the working state, the user presses the key switch 51 to make the nail gun enter the maintenance mode;

S4: The user triggers the trigger module 6 to transmit the driving signal of the motor 3 to the controller 4, thereby the ejection module 7 is controlled to be in the relaxed state;

S5: The user disassembles the nail gun for maintenance.

Among them, in step S3, when there is no fault state in the working state, the nail gun enters the nailing mode, and the nailing mode is the normal working mode, that is, the user can perform normal nailing operations; in addition, the fault state includes at least one of a short circuit state, an open circuit state and a stuck nail state, but is not limited to the above three fault states, such as a low voltage protection state, an overvoltage protection state, an over-temperature protection state, etc.

In this embodiment, the controller 4 may also be connected to the maintenance prompt module 8. When the fault state occurs in the working state, that is, at least one of the short circuit state, the open circuit state and the stuck nail state occurs, the controller 4 controls the maintenance prompt module 8 to issue the alarm or the voice prompt, among them, the maintenance prompt module 8 includes at least one of the indicator light module 81 and the voice prompt module 82; the indicator light module 81 includes the LED light, which prompts the user through the color or the flashing of the LED light that the nail gun needs to be disassembled for maintenance at the time; the voice prompt module 82 includes the voice player, which plays the voice through the voice player to prompt the user that the nail gun needs to be disassembled for maintenance at this time.

The embodiment first determines whether the nail gun needs to be disassembled for maintenance by detecting the working state of the nail gun, that is, when the working state of the nail gun fails, the key switch 51 is pressed to make the nail gun enter the maintenance mode; then the trigger module 6 is triggered to transmit the driving signal of the motor 3 to the controller 4, thereby the ejection module 7 is controlled to be in the relaxed state; finally, the nail gun is directly disassembled for maintenance; the entire disassembly and maintenance process is simplified and intelligent, which greatly reduces the failure rate of the nail gun and also improves the safety factor of the use of the nail gun.

In addition, the maintenance reminder module 8 involved in the above embodiment 3 to embodiment 6 also includes a display module 83 for displaying usage data of the nail gun, which includes the number of nails driven by the nail gun, the number of turns the motor 3 has rotated, the operating time of the motor 3, and fault information of the nail gun, etc.

The present application is not limited to the above-mentioned specific embodiments. A person skilled in the art can easily understand that the maintenance system of the nail gun and the method of maintaining the nail gun of the present application have many other alternatives without departing from a principle and a scope of the present application. The scope of protection of the present application shall be based on the contents of the claims.

The invention claimed is:

1. A maintenance system of a nail gun, comprising a power module, a drive module, a motor and a controller, the power module being connected to the drive module, the drive module being connected to the motor, and the controller being connected to the drive module; wherein the maintenance system further comprises a maintenance module, a trigger module, and an ejection module; the controller is connected to the maintenance module and is used to detect a level state of the maintenance module;

the controller determines a working mode of the nail gun according to the level state;

the ejection module is connected to the motor and driven by the motor;

the trigger module is connected to the controller and transmits a driving signal to the controller according to the working mode to control an operation of the motor, thereby controlling an operating state of the ejection module;

wherein the maintenance module comprises a key switch, the key switch comprises an a end and an b end, the a end of the key switch is connected to the controller, the b end of the key switch is grounded, and the a end of the key switch is electrically connected to a pull-up power supply; wherein the working mode of the nail gun is configured according to a level signal of the a end of the key switch.

2. The maintenance system of the nail gun according to claim 1, wherein the level state comprises a high level state and a low level state, and the working mode comprises a nailing mode and a maintenance mode; when the controller detects that the maintenance module is in the high level state, the nail gun is in the nailing mode; when the controller detects that the maintenance module is in the low level state, the nail gun is in the maintenance mode.

3. The maintenance system of the nail gun according to claim 2, wherein the operating state of the ejection module comprises a compressed state and a relaxed state; when the nail gun is in the nailing mode, the ejection module is in the compressed state, the trigger module is triggered to control the motor to rotate forward and drive the ejection module to complete a nailing; when the nail gun is in the maintenance mode, the trigger module is triggered to control the motor to rotate reversely to control the ejection module to be in the relaxed state.

4. The maintenance system of the nail gun according to claim 3, wherein the maintenance module further comprises a capacitor, the capacitor is connected in parallel between the a end and the b end of the key switch.

5. The maintenance system of the nail gun according to claim 1, wherein in response that the key switch is turned on, and the controller detects that the level signal of the a end of the key switch is 1, the working mode of the nail gun is configured to be the nailing mode;

in response that the key switch is closed, and the controller detects that the level signal at the a end of the key switch is 0, the working mode of the nail gun is configured to be the maintenance mode.

6. The maintenance system of the nail gun according to claim 1, wherein the drive module is a three-phase inverter, and the controller is an MCU controller.

7. The maintenance system of the nail gun according to claim 1, wherein the controller is further connected to a maintenance prompt module, the maintenance prompt module comprises at least one of an indicator light module and a voice prompt module; the indicator light module comprises an LED light, and prompts a user through a color or a flashing of the LED light that the nail gun needs to be disassembled for maintenance; the voice prompt module comprises a voice player, and plays a voice through the voice player to prompt the user that the nail gun needs to be disassembled for maintenance.

8. A method for maintaining a nail gun applied to a maintenance system according to claim 1, comprising:

obtaining a working state of the nail gun;

in response that a fault state occurs in the working state, and a key switch of the nail gun is pressed, configuring a working mode of the nail gun to be a maintenance mode;

triggering the trigger module to transmit a driving signal of a motor to a controller, thereby controlling an ejection module to be in a relaxed state;

disassembling the nail gun for maintenance when the ejection module is in the relaxed state.

9. The method for maintaining the nail gun according to claim 8, further comprising:

in response that there is no fault state in the working state, configuring the working mode of the nail gun to be a nailing mode, wherein the fault state comprises at least one of a short circuit state, an open circuit state and a stuck nail state.

10. A method for maintaining a nail gun applied to a maintenance system, wherein the method comprises:

presetting a threshold value Q of a maintenance parameter of the nail gun;

obtaining a maintenance parameter q of the nail gun;

in response that the maintenance parameter q of the nail gun is greater than or equal to the threshold value Q of the maintenance parameter of the nail gun, and a key switch of the nail gun is pressed, configuring a working mode of the nail gun to be a maintenance mode for maintenance;

wherein the threshold value Q of the maintenance parameter of the nail gun comprises at least one of a threshold value T of a maintenance time of the nail gun, a threshold value N of a number of turns the motor has rotated, and a threshold value M of a number of nails driven by the nail gun.

11. The method for maintaining the nail gun according to claim 10, wherein in response that the maintenance parameter q of the nail gun is less than the threshold value Q of the maintenance parameter of the nail gun, the nail gun enters a nailing mode.

12. The method for maintaining the nail gun according to claim 10, wherein when the threshold value Q of the maintenance parameter of the nail gun comprises the threshold value T of the maintenance time of the nail gun, the maintenance parameter q of the nail gun comprises a running time t of the motor.

13. The method for maintaining the nail gun according to claim 12, wherein the running time t is an accumulated running time length of the motor, the method further comprises:

outputting an alarm or a voice prompt in response that the running time $t \geq T$.

14. The method for maintaining the nail gun according to claim 13, wherein the threshold value T of the maintenance time of the nail gun has a value range of 360 h~480 h.

15. The method for maintaining the nail gun according to claim 12, wherein when the threshold value Q of the maintenance parameter of the nail gun comprises the threshold value N of the number of turns the motor has rotated, the maintenance parameter q of the nail gun comprises a number n of turns the motor has rotated.

16. The method for maintaining the nail gun according to claim 15, wherein the number of turns the motor has rotated has a value range of 300,000 to 500,000.

17. The method for maintaining the nail gun according to claim 15, wherein when the threshold value Q of the maintenance parameter of the nail gun comprises the threshold value M of the number of nails driven by the nail gun, the maintenance parameter q of the nail gun comprises a number m of nails driven by the nail gun.

18. The method for maintaining the nail gun according to claim 17, wherein the threshold value M of the number of nails driven by the nail gun has a value range of 30,000 to 50,000.

19. The method for maintaining the nail gun according to claim 10, further comprising:

resetting the maintenance parameter q of the nail gun to zero after the maintenance.

* * * * *